Aug. 13, 1968　　　D. W. STONE　　　3,397,309
SPEED LIMIT CONTROL SYSTEM
Filed July 19, 1965　　　　　　　　　2 Sheets-Sheet 1
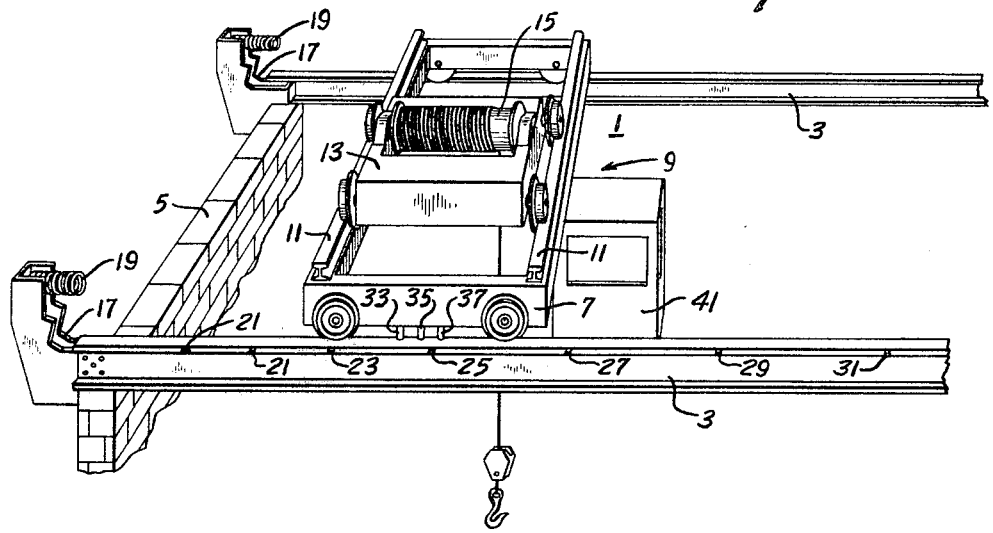
*Fig. 1.*
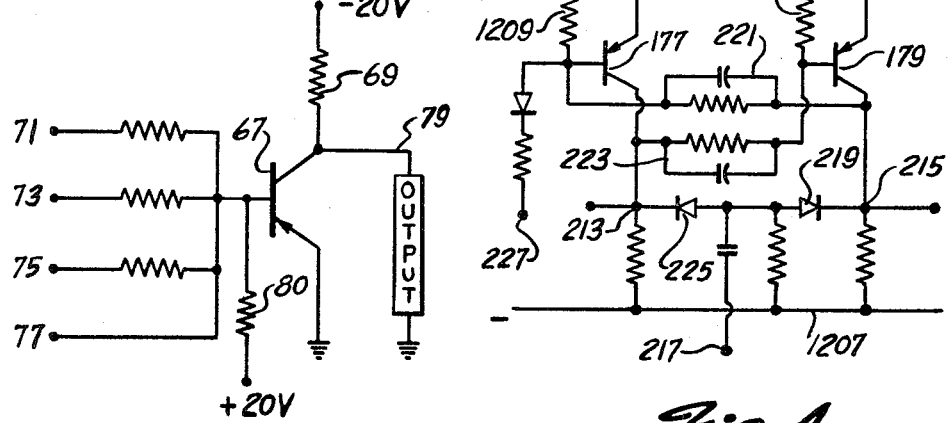
*Fig. 3.*　　　*Fig. 4.*
INVENTOR.
DAVID W. STONE
BY
Lieber & Nilles
ATTORNEYS

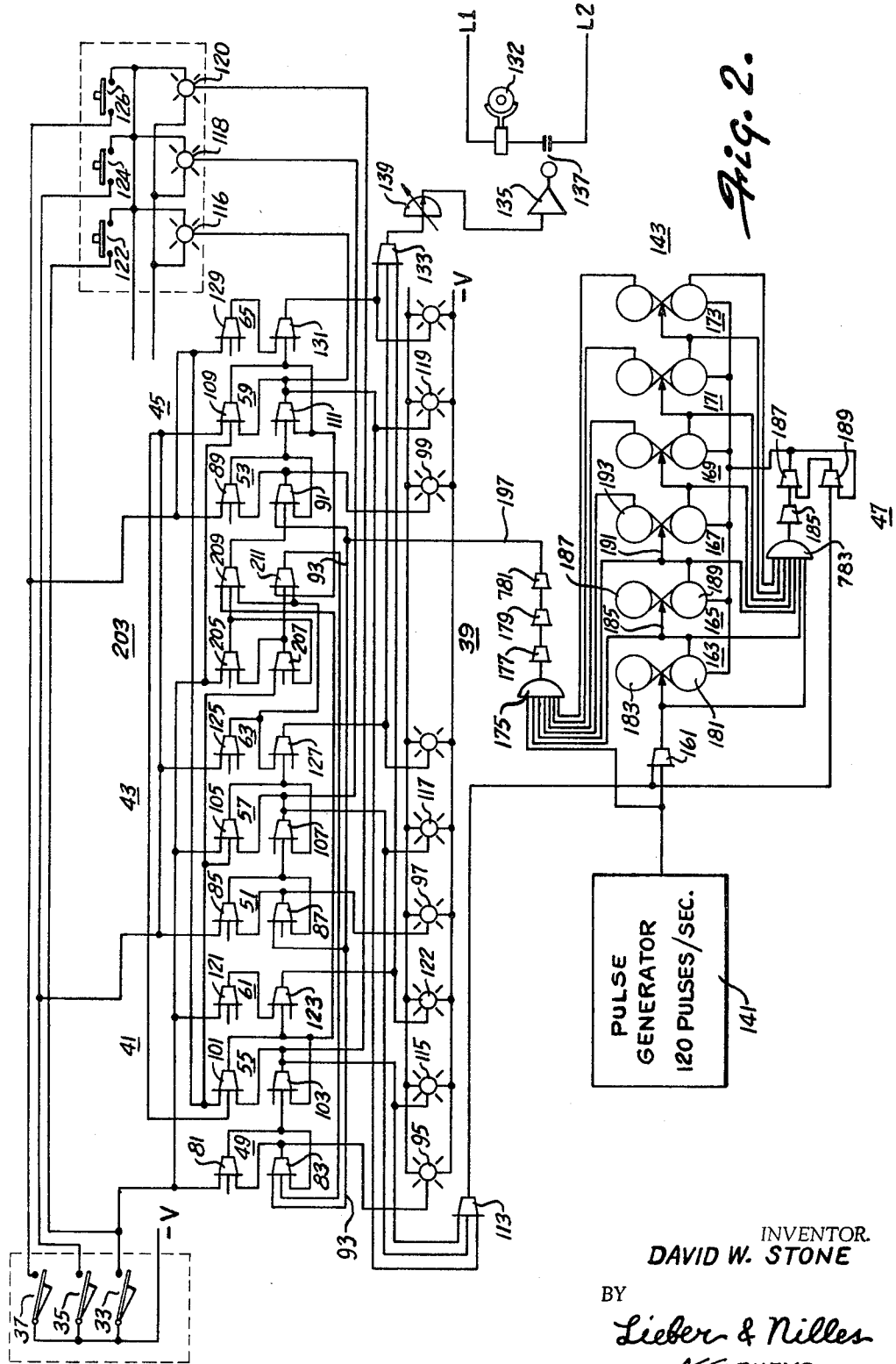

United States Patent Office 3,397,309
Patented Aug. 13, 1968

3,397,309
SPEED LIMIT CONTROL SYSTEM
David W. Stone, Hales Corners, Wis., assignor to Harnischfeger Corporation, West Milwaukee, Wis., a corporation of Wisconsin
Filed July 19, 1965, Ser. No. 472,961
6 Claims. (Cl. 246—182)

ABSTRACT OF THE DISCLOSURE

A speed limit control system for a vehicle includes a plurality of sensing means operable indicators placed in the path of the vehicle A control means is connected to the sensing means and includes a timer having a predetermined timing interval. Actuation of the control means by the sensing means operates the timer to determine whether the vehicle has traversed the distance between two adjacent indicators in a time period greater or less than the timing interval, and hence the speed of the vehicle. The speed limit control system is provided with additional control means so that if the first fails to operate, the second or third will provide the necessary speed limiting action.

---

This invention relates to speed control systems and more particularly to control systems for limiting vehicle speed to a safe value. While the invention may be used in many contexts and environments, it finds particular utility when employed to control the speed of rail or cable mounted vehicles, such as, trolleys, material handling vehicles, or travelling cranes. For purposes of explanation, the invention will be described as applied to the latter.

Travelling cranes utilize a pair of elevated, parallel rails mounted on opposite sides of the work area which the crane is to serve. These rails support a travelling bridge mounted on end trucks containing propulsion gear. The travelling bridge itself has rails upon which run a trolley containing the hoist drive and cable drums. The work area is served by controlling the two rectilinear motions of the crane. Movement of the travelling bridge is termed "bridging" while the motion of the trolley is termed "trolleying."

Serious problems have arisen in the past because the crane operator may, while concentrating on his guide or attempting to position a load, allow the travelling bridge or trolley to run to the end of the rails. While stops are provided to prevent the bridge or trolley from going off the end of the rails and resilient bumpers are provided to cushion the mechanical shock when the bridge or trolley hits the stop, these bumpers are usually incapable of providing satisfactory cushioning when the bridge or trolley hits the stop at greater than twenty percent of its rated speed. Attempting to provide protection through resilient bumpers for speeds greater than twenty percent of rated speed results in bumpers of a prohibitively large size.

Thus, when the bridge or trolley hits the stops at greater than twenty percent of rated speed, it is subject to mechanical damage. This mechanical damage is extremely difficult, expensive, and time consuming to repair because of the size and weight of the structures involved and their elevated position.

On the other hand, it is equally important not to reduce the operating efficiency of the travelling bridge or trolley by an inordinate limiting of speed merely to insure that the bridge or trolley will not strike the stops at greater than a safe speed.

It is, therefore, desirable to provide a speed control means which permits the travelling bridge, trolley, or other vehicle to travel at maximum speed except when the danger exists that such operation, unless limited, will cause the bridge to strike the stops at greater than a safe speed.

The maximum speed that the travelling bridge, trolley, or other vehicle may attain at any given point on the rails without exceeding a safe speed is based on several factors. One such factor is the decelerating force which the structure can withstand or which the operator or the speed control system may apply by the braking means provided in the crane. Another such factor is the distance of the bridge or trolley from the end of the rails, as this determines how long a time interval the brake may operate in to reduce the speed of the bridge or trolley. The farther the bridge or trolley is from the end of the rail, the greater may be its maximum speed. A further factor is the response time of the braking means.

The speed control described and claimed herein, provides a means for preventing damage to moving vehicles, through striking stops or bumpers at excessive speeds. The control does not otherwise interfere with the operation of the vehicle.

The speed control further provides for the continuous measurement of maximum safe speed in a plurality of zones along the path which take into account the distance of the vehicle from the stop and the decelerating force of the vehicle braking means so as to not unduly limit the operating speed of the vehicle and reduce its efficiency.

The invention further provides such speed control automatically so as to override control by the vehicle operator.

The determination of excessive speed may be made in a plurality of directions and is obtained redundantly, precluding the possibility that failure or tampering with one part of the control will permit the vehicle to exceed its maximum safe speed and is applied to the vehicle in a manner such that failure of the control or a loss of power will act to reduce the speed of the vehicle.

The elements of the control comprise static logic circuits and other components of similar long life and reliability to provide substantially trouble-free operation for substantial periods of time.

Briefly, the speed control of this invention provides for the placing of a plurality of indicators or tripping means in the path of the travelling bridge, trolley, or other vehicle. The indicators form a plurality of zones along the rails and are spaced apart the distance the vehicle will travel in a predetermined time at the maximum safe speed. The maximum safe speed is, of course, determined by the distance the vehicle is from the end of the rails and the effectiveness of its braking means. A plurality of sensing devices are mounted on the vehicle and are actuable by the plurality of tripping means. A control means is connected to the sensing means in such a manner as to be operable when the sensing means encounters the tripping means. The speed limit control includes a timing device having a predetermined timing cycle. Actuation of the control means by the sensing means operates the timing device to permit the speed limit control to determine whether the vehicle has traversed the distance between two adjacent indicators in a time interval greater than the predetermined timing cycle, indicating the vehicle is travelling at less than the maximum safe speed, or has traversed the distance in less than the predetermined timing cycle, indicating that the speed of the vehicle exceeds maximum safe speed. In the latter instance, the speed limit control operates to reduce the speed of the vehicle.

The speed limit control is provided with additional control means so that if the first fails to operate, the second or third will provide the necessary speed limiting action.

The invention may be further understood by reference to the following example. As previously mentioned, the control may be utilized to insure that the bridge or trolley of a travelling crane does not hit the resilient bumpers at the end of the rails at a speed in excess of that which can be safely absorbed by the bumpers. This is generally twenty percent of the maximum attainable speed. If, for example, the maximum bridge speed is 7.5 ft./sec., the bumpers will safely stop a bridge, striking them at 1.5 ft./sec. The reduction in speed from the maximum speed to safe speed depends upon the decelerating force of the brak-means and its response time and the time interval over which it operates. Therefore, the closer the bridge is to the bumper, the slower it must be going in order that its speed may be reduced to a safe value by the brake. Assuming the maximum decelerating force applied by the brake is .75 ft./sec.$^2$, the following table shows the maximum speed which the braking means can reduce to a safe speed at the bumper as compared to various distances of the bridge from the bumper:

| Distance of bridge from bumper in feet: | Maximum bridge speed for safe stop in ft./sec. |
| --- | --- |
| 36 and beyond | 7.5 |
| 22.5 | 6 |
| 12 | 4.5 |
| 4.5 | 3.0 |
| 0 | 1.5 |

From the above table, it may be seen, for example, that the speed of the trolley may not exceed 4.5 ft./sec. when the trolley is within twelve feet of the bumper as the braking means will be unable to decelerate it to a safe speed in the time and distance remaining before the trolley hits the bumper.

Knowing the maximum safe speed at any given point along the rails, the distance the bridge will travel at that maximum safe speed during a predetermined time may easily be determined. If the bridge traverses that distance in greater than the predetermined time, it is going slower than the maximum speed, whereas if it traverses the distance in less than the predetermined time, it is going faster. For example, if .5 second is used as the predetermined time, a bridge going 4.5 ft./sec. will travel 2.25 feet during the predetermined time. Likewise, at maximum speed, the bridge will travel 3.75 feet in one-half second.

As previously mentioned, the speed limit control utilizes a plurality of tripping means on the rails and sensing means in the control to determine whether the bridge has traversed such a distance in a greater or lesser time interval than the predetermined time and to permit the trolley to proceed unimpeded toward other tripping means closer to the bumper or to actuate the braking means and reduce the speed of the trolley. If permitted to proceed unimpeded, additional indicators subsequently determine the speed of the bridge and provide a similar controlling action.

The first indicator, in this example, would be placed .8 feet from the bumper, the second 1.87 feet, and the third 3.09 feet, etc., up to the last indicator at 36 feet. The position of the indicators may be determined for any given application, knowing the maximum speed of the vehicle and the rate of deceleration, by applying the well-known physics principles of rectilinear motion.

The invention, together with its construction and mode of operation, may be better understood by reference to the following specification and drawings forming a part thereof, in which:

FIGURE 1 is a diagrammatic illustration of a vehicle with which the control of this invention may be utilized;

FIGURE 2 is a circuit diagram of the speed limit control of this invention;

FIGURE 3 is a circuit diagram of one of the elements of the control of FIGURE 2; and FIGURE 4 is a circuit diagram of one of the elements of the control of FIGURE 2.

Referring now to FIGURE 1, there is shown therein a travelling crane indicated by the numeral 1. The crane is supported by a pair of elevated rails 3 supported by the adjacent building structure 5 or other suitable support means. Mounted on rails 3, by means of end trucks 7, is the travelling crane bridge 9 extending between the two parallel rails 3. End trucks 7 contain the propulsion and braking equipment for bridge 9. The bridge 9 includes a second pair of parallel rails 11. A trolley 13 containing hoisting gear, such as the cable drum 15 and associated drive mechanism, is mounted on the rails 11.

At each end of rails 3 are rail stops 17 which prevent end trucks 7 from travelling beyond the end of the rail. Resilient bumper means, shown as coil springs 19, are mounted on rails 3 adjacent stops 17 to cushion the shock of end trucks 7 hitting stops 17.

Rails 3 have mounted thereon a plurality of tripping means 21 through 31 at spaced intervals. These tripping means are spaced apart the distance the bridge will travel at the maximum safe speed for that point on the rails 3 during a predetermined time, as explained above. Tripping means 21 through 31 operate a plurality of sensing means 33, 35, and 37 on end truck 7 to ascertain when the bridge has passed one of the tripping means 21 through 31. Sensing means 33, 35 and 37 are connected to the speed limit control means 39 which may be mounted at any convenient place on the bridge structure. Tripping means 21 through 31 may operate sensing means 33, 35 and 37 by striking a sensory element thereon or through magnetic or electric interaction. For example, tripping means 21 through 31 may be ferromagnetic material attached to the rails which operates magnetic reed switches comprising sensing means 33, 35 and 37.

FIGURE 2 shows the details of the speed limit control means 39. Speed limit control means 39 consists in general of a plurality of static logic circuits 41, 43, and 45 connected to sensing means 33, 35, and 37 and a timing device 47 also connected to the static logic circuits. A plurality of such logic circuits are included in control means 39 to obtain, among other things, redundancy so that if one logic circuit fails, the others will continue to provide safe control over maximum speed. Additional testing and safety equipment are also included in the control.

Static logic circuits 41, 43, and 45 contain circuit components 49, 51, and 53 which set or prepare the logic circuit for operation, circuit components 55, 57, and 59 which operate the timing device 47 to determine whether the bridge is moving at greater or lesser than maximum speed, and circuit components 61, 63, and 65 which initiate the operation of the braking means in end trucks 7.

The circuit components comprising static logic circuits 41, 43, and 45 are formed by a plurality of logic elements known as NOR logic elements, as defined in N.E.M.A. Standards Publication IC2–1965, Sec. 2, Part 15. As the name implies, NOR logic elements provide an output signal only when there is no input signal on the first, nor the second, nor the third, nor any of the input circuits.

As such, the element may comprise a transistor 67 biased as shown in FIGURE 3. The collector of transistor 67 is biased to −20 volts through resistor 69. The emitter is connected to ground while the base is biased to a +20 volts through resistor 80. Under these conditions, transistor 67 is in the non-conducting state, and a signal appears at output 79 of the NOR element due to the current flow between the −20 volt potential and ground.

If, however, a negative signal is applied to any of inputs 71, 73 or 75, transistor 67 will be biased into the conductive state by the negative voltage at its base. This will provide a low impedance path for the current flow between the −20 volt potential and ground and will remove the signal from output 79. Thus, when there is a signal to one of the input terminals, there is no output signal; and when there is no input, a signal appears at the output. The common engineering symbol for the circuitry shown in FIGURE 3 is the trapezoidal symbol shown in FIGURE 2, as for example, element 81, with the inputs placed on the larger base and the output on the smaller.

Circuit components 49, 51, and 53 which set logic circuits 41, 43, and 45 for operation comprise two NOR logic elements 81, and 83, 85 and 87, 89 and 91, respectively. Element 81 has one of its inputs connected to sensing means 33, while the other input is connected to the output of element 83. Element 83 has one input from timing device 47 through conductor 93, one input from the output of element 81, and a third input from circuit 203, hereinafter described, which prevents false operation of the control in certain operational sequences as hereinafter described.

Circuit component 51 is similar to component 49 except that the input of element 85 is connected to sensing means 35, and there is no input from circuit 203. Circuit component 53 is also similar to component 49 except that the input of element 89 is connected to sensing means 37. The outputs of elements 83, 87, and 91 are also connected to a visual display means 95, 97, 99, such as lamps, to indicate when the respective static logic circuits have been set.

Circuit components 55, 57, and 59 likewise comprise two NOR elements each: 101 and 103, 105 and 107, and 109 and 111. Element 101 of component 55 has one input connected to sensing means 35, one input connected to sensing means 37, and one input connected to the output of element 103. In element 103, one input is connected to the output of element 81, and one input is connected to the output of element 101.

Components 57 and 59 are connected in an analogous manner, element 105 being connected at the input to sensing means 33 and sensing means 37 and element 109 being connected to sensing means 33 and sensing means 35.

The outputs of elements 103, 107, and 111 are connected to NOR element 113 which operates timing device 47. The outputs of elements 103, 107, and 111 are also connected to lamps 115, 117, and 119, and 116, 118, and 120. The latter set of lamps, along with switches 122, 124, and 126, enable the operator to check the operation of the logic circuits by duplicating the action of sensing means 33, 35, and 37.

Circuit components 61, 63 and 65 which initiate the operation of braking means to reduce the speed of the bridge if necessary also comprise two NOR elements each, 121 and 123, 125 and 127, and 129 and 131. In circuit component 61, the input of element 121 is connected to sensing means 33, while the output of that element is connected to the input of element 123. The output of element 101 is also connected to the input of element 123. The output of element 123 is connected to NOR element 133 which initiates the operation of the braking means 132 through on delay timer 139, amplifier 135 and relay 137.

Braking means 132, which may be of any common type, is mounted in the drive mechanism of bridge 9. Amplifier 135 and relay 137 operate in a manner such that the positive application of a signal thereto is required to release the braking means 132. Removal of a signal to amplifier 135 applies braking means 132. This connection plan is often called a "fall safe" connection; that is, loss of power or failure of the control means causes the braking means to be applied resulting in a safe condition.

The operation of on delay timer 139 is such that when an input signal is applied thereto, an output signal is provided therefrom after a short delay. When, however, the input signal is removed, the output signal ceases immediately, and the timer actuates braking means 132.

Elements 125 and 127 of component 63 are connected in a similar fashion: the input of element 125 being connected to sensing means 35. The input to element 129 of component 65 connected to sensing means 37.

Timing device 47 may be any device capable of providing an output signal at the end of a predetermined time interval. As such, it may be a mechanical timer, an R-C time constant circuit, or a pulse generator-preset counter circuit. FIGURE 2 shows the latter type of timing device which employs a pulse generating circuit 141 and a preset binary counting circuit 143. Pulse generating circuit 141 may be of the common type which operates from a 60-cycle alternating current supply line to produce 120 pulses per second. It is preferable, though not essential, that the pulse duration be from 2 to 7 milliseconds in duration. Counting circuit 143 records the pulses and produces an output after the number of pulses corresponding to the desired time interval have been recorded. In the previous example, this would be sixty pulses or one-half a second.

The pulses from pulse generator 141 are supplied to NOR element 161 which provides the pulse input to counter 143. NOR element 161 also has an input from NOR element 113 to control timer 47 in accordance with the operation of static logic circuits 41, 43, and 45.

Preset binary counting circuit 143 consists of a plurality of binary counting devices, shown diagrammatically as bi-stable circuits 163 through 173. The bi-stable circuits record the number of pulses entering the circuit from NOR element 161 by changing from one stable state to another, thereby altering the condition of their output. Such alteration may be either from the presence of a signal to the absence of one or vice versa. The output will be in the form of a pulse.

The bi-stable circuits 163 through 173 are shown as schematic elements of counting circuit 47 in FIGURE 2 for simplicity. FIGURE 4 shows a circuit which may be employed as circuits 163 through 173 in FIGURE 2. Each circuit 163 through 173 provides an output signal pulse for each two input signal pulses applied thereto and when connected in series as shown in FIGURE 2 serve to record the number of signal changes or pulses supplied to binary counting circuit 143. The number of pulses recorded is, of course, proportional to elapsed time so that when 60 pulses have been recorded, .5 second have elapsed. Additional circuits may be added if pulses greater than 63 in number must be recorded.

The two stable states of bi-stable circuits 163 through 173 are shown schematically in FIGURE 2 by a pair of circles. These circles may be considered to represent transistors 177 and 179 in the circuit diagram in FIGURE 4 which are alternately turned on and off. For example, the first pulse received by bi-stable circuit 163 from NOR element 161 will switch bi-stable circuit 163 from the state represented by circle 181 to the state represented by circle 183. This is the equivalent of turning off transistor 177 and turning on transistor 179. This will cause a change in the condition of the output signal. The next pulse injected into bi-stable circuit 163 will cause the circuit to revert to its original state. That is, the element represented by circle 181 will be on, and the element represented by circle 183 will be off. This is the equivalent of turning on transistor 177 and turning off transistor 179. The change in output caused by the reversion of bi-stable circuit 163 to its original state will cause the output signal in output conductor 185 to revert to its original state. The two changes in the output signal form a pulse which will cause bi-stable circuit 165 to switch so that the element represented by the upper circle 187 is conducting.

The third pulse received by the binary counting circuit 143 will cause the upper element of bi-stable circuit 163 to assume the on state. Element 187 also remains in the on state. When the fourth pulse is received by binary counting circuit 143, bi-stable circuit 163 will revert to its original condition, forming a second output pulse through conductor 185. This pulse will cause bi-stable circuit 165 to revert to its original condition, that is, with element 189, rather than element 187, in the conducting state. The reversion of bi-stable element 165 to its original state will produce an output pulse signal in conductor 191. This will cause bi-stable circuit 167 to switch to a condition wherein element 193 is on. The above-described counting process is continued in binary counting circuit 143 as long as pulses from pulse generator 141 are supplied through NOR element 161 to the counting circuit 143.

The output from the bi-stable circuits 163 through 173 of preset binary counting circuit 143 are provided to OR gate 175. An OR gate is a commonly used circuit element which provides an output when there is an input to the first input, or the second input, or the third input.

The outputs of bi-stable circuit 163 through 173 are connected to OR gate 175 in a manner such that when 60 pulses have been recorded in the bi-stable circuits there will be no inputs to OR gate 175. This may be accomplished simply by connecting the OR gate to the transistor in the bi-stable circuit that will be off when 60 pulses have been recorded.

The output of pulse generator 141 is also connected to OR gate 175.

When all the inputs to OR gate 175 lack signals, the output signal from OR gate 175 is removed. The removal of this signal, when passed through NOR elements 777, 779, and 781 results in a signal from the output of element 781 to conductor 197. This signal is applied to logic circuits 41, 43, and 45, as described hereinafter, and through these circuits to NOR element 113 and to NOR element 161. The output of NOR element 161 when supplied through bi-stable circuit 163 to OR gate 175 provides an output signal therefrom which removes the signal on conductor 197.

The binary counting circuit 143 is reset for another counting operation by OR gate 783 which is connected to the outputs of bi-stable counting circuits 163 through 173 in the same manner as OR gate 175. The output from OR gate 783 along with the output from NOR element 113, is supplied through NOR elements 185, 187, and 189 to bi-stable counting circuits 163 through 173 to reset them to the initial state and prepare them for the next timing operation.

Referring to FIGURE 4, there is shown therein a bi-stable circuit for use in binary counting circuit 143. The bi-stable circuit is supplied with positive direct current voltage from conductor 1203, ground potential from conductor 1205, and negative potential from conductor 1207. The circuit includes two transistors 177 and 179 having their base terminals connected to conductor 1203 via resistors 1209 and 1211, respectively, and their collector-emitter circuits connected between conductors 1205 and 1207. As either of the transistors in a bi-stable circuit may be on or off, it is necessary to assume a set of initial conditions before analyzing the circuit. Assuming that transistor 177 is on and transistor 179 is or, junction 213 is at ground potential while junction 215 is at the negative D.C. potential of conductor 1207. If a positive pulse, that is, a decreasing negative signal or an increasing positive signal, is supplied to input terminal 217, it will tend to flow through diode 219 to junction 215, attracted by the negative potential existing there. The positive signal thus applied to junction 215 will flow through a parallel resistive-capacitive circuit 221 to the base terminal of transistor 177, turning that transistor off. The turning off of transistor 177 causes the voltage existing at junction 213 to approach that of the negative D.C. voltage in conductor 1207 and causes transistor 179 to turn on by this negative voltage applied through resistive-capacitive network 223. When the next positive pulse is applied to input 217, it will be attracted to junction 213 through diode 225, turning off transistor 179 and turning on transistor 177. The output terminals are connected to junctions 213 and 215. With transistor 179 in the non-conducting or off state, as initial conditions, the voltage at output terminals 215 will be the negative D.C. voltage existing in conductor 1207. When transistor 179 is turned on and transistor 177 is turned off, the voltage at output terminals 215 will rise to ground potential. When transistor 179 is again turned off, the voltage at output terminal 215 will again fall to the negative D.C. voltage in conductor 1207. Thus, the bi-stable circuit shown in FIGURE 4 produces one output pulse at terminal 215, that is, one change from the negative D.C. voltage to ground and back to the negative D.C. voltage for every two pulse signals applied to input 217.

The binary counting circuit is reset by a negative signal applied to terminal 227. This negative signal forces the base of transistors 177 negative thereby placing transistor 177 into conductive state regardless of the input at terminal 217. The output 213 of the bistable circuit will then be zero.

It will be appreciated that a similar counting circuit may be constructed of NOR logic elements if desired.

The operation of the above-described control means 39 is as follows: For initial conditions, it may be assumed that the travelling bridge 7 is at rest in the center of the rails. It may also be assumed that the previously described signal on conductors 197 and 93 from timer 47 provides an input to NOR elements 83, 87, and 91 which removes the output signals therefrom. This will also remove an input signal to elements 81, 85, and 89. With the bridge at rest in the center of the rails, none of the tripping means 21 through 31 will have been encountered and the remaining inputs to NOR elements 81, 85, and 89 will also lack input signals. These elements will, therefore, have output signals which will be fed back to NOR elements 83, 87, and 91 respectively, removing the need for signal from conductors 197 and 93. The output signals from NOR elements 81, 85, and 89 are supplied to NOR elements 103, 107, and 111 respectively, removing the output signals therefrom. This operates NOR elements 113 and 161 to prevent pulses from pulse generator 141 from entering binary counter 47 and initiates the resetting of binary counting circuitry 143. Elements 103, 107, and 111 are supplied with additional input signals from NOR elements 101, 105, and 109 as all the inputs to these elements are without input signals.

NOR elements 101, 105, and 109 also provide input signals to NOR elements 123, 127, and 131 which through NOR 133 provides a signal to on-delay timer 139, amplifier 135 and relay 137 which closes contacts 137 preventing the operation of braking means 132 and permitting the operator to operate bridge 7 at any attainable speed.

As bridge 7 approaches stop 17, it will encounter the first of the tripping means, for example, tripping means 31. This will generate a short pulse from sensing means 33 as it moves past the indicator providing inputs to elements 81, 121, 105, and 109. The input signal to element 81 will remove the output from that element. The zero output from element 81 is supplied to the input of element 83 providing an output from that element. This output is fed back to element 81 to insure the lack of output therefrom. The zero output from element 81 is also supplied to element 103 but has no effect thereon because of the input supplied to this element from the output of element 101. The control in this state is termed "set" and indicator lamp 95 is actuated to indicate this condition.

The pulse from sensing means 33 to element 121 turns that element off, but the loss of output has no effect on element 123 because of the input signal to that element from element 101. The cessation of the pulse causes element 121 to revert to its original condition, but this likewise has no effect on the condition of element 123. The inputs to elements 105 and 109 have no effect for similar reasons.

Sensing means 35 will encounter indicator 31 shortly after sensing means 33 and will provide an input pulse to elements 109, 101, 125, and 85. The input signal to element 101 removes the output signal from that element to element 103. This provides an output signal from element 103. The output signal from element 103 operates NOR elements 113 and 161 to begin supplying pulses from pulse generator 141 to binary counting circuit 143, starting the timing cycle. The fact that the static logic circuit 41 is timing is indicated to the operator by visual display device 115.

The input signal from sensing means 35 to elements 85 and 125 will provide the same operation of static logic circuit 43 that the input signal from sensing means 33 provided to static logic circuit 41, that is, it will energize it to the "set" condition in preparation for operating the timer 47.

The pulse from sensing means 35 applied to element 109 of static logic circuit 45 has no effect on that circuit.

Sensing means 37 will encounter indicator 31 immediately after sensing means 35. This will provide input signals to element 89, 101, 105, and 129. The signal to element 101 will have no effect on the operation of static logic circuit 41, assuming that the input signal from sensing means 35 applied to that circuit was successful in starting timer 47. If, for some reason, sensing means 35 is defective and fails to start timer 47, the signal from sensing means 37 will start the timer 47. This redundant starting of timer 47 insures operation of the control means 39 to limit the speed of bridge 7 in spite of the possible failure of sensing means 35. If any one of the sensing means 33, 35, and 37 fail in the closed position, the actuation of a succeeding sensing means will initiate the braking action.

If the timer 47 has failed to start, not because of the failure of sensing means 35 but because of the failure of some element of static logic circuit 41, the signal to element 105 will cause static logic circuit 43 to start the timer 47 in the same manner that the signal from sensing means 35 would have started an operative static logic circuit 41. This provides for the further safe operation of bridge 7. The fact that static logic circuit 43 has started, or attempted to start, timer 47 is indicated to the operator by visual device 117.

The signals to elements 89 and 129 of static logic circuit 45 from sensing means 37 switch that circuit to the "set" state in the same manner that the pulse from sensing means 33 "set" static logic circuit 41 and the pulse from sensing means 35 "set" static logic circuit 43.

Assuming that bridge 7 is running slower than the maximum permissible speed in the zone between indicators 31 and 29, the timer 47 will measure the elapsed time before indicator 29 is reached. In the case of the binary counting circuit 143 shown in FIGURE 2, the counter will record the designated number of counts before indicator 29 is reached. When the timer has completed measurement of the elapsed time, it supplies a reset signal in conductor 197 to conductor 93. Conductor 93 provides an input reset signal to elements 83, 87, and 91. The signal to element 83 removes the output signal from that element and restores the output signal to element 81. This in turn removes the output signal from element 103 and restores the output to element 101. The output from element 101 supplied to the input of element 123 insures that there can be no output from the latter element to activate braking means 132.

The input signals to elements 83, 87, and 91 also return static logic circuits 41, 43, and 45 to their original state in preparation for another speed measurement in the next zone.

As travelling bridge 7 continues along rails 3 toward stops 17, sensing means 33 will encounter the second indicator 29. This will repeat the above-described operation. It is to be noted that sensing means 37 is not used in the speed measurement in this direction of crane travel unless there is a failure of sensing means 33 or 35 or static logic element 41. In the latter instances, static logic circuit 43 operates redundantly to static logic circuit 41 to provide speed control in spite of the failure of the above portions of control means 39.

If travelling bridge 7 is proceeding too rapidly along rails 3, sensing means 33, 35, and 37 will encounter indicator 29 before the timer has expired. Sensing means 33 will supply a pulse as before to the input of element 121 of static logic circuit 41. This will remove the output from that element and the input to element 123. The loss of input to element 123 will provide an output signal therefrom, as there is no input to element 123 from element 101. The output signal from element 123 will initiate operation of braking means 132 to decelerate the crane it strikes the stop 17 at a dangerous speed. The initiation of the operation of braking means 132 is indicated by visual display means 122.

It is to be noted that when the travelling bridge is travelling in the other direction, sensing means 37 and 35 provide signals to static logic circuit 45 for speed limit control, and sensing means 33 and static logic circuit 43 operate only in case of a component failure in control means 39.

The operation of control 39 is such that if the pulse from sensing means 33 and the signal from timer 47 are received simultaneously, the former signal takes precedence and the operation of braking means 132 is initiated. This provides the safest possible operation of bridge 7.

Static logic circuit 203 prevents false operation of the control 39. For example, if bridge 9 is proceeding toward stop 17 slowly and then is speeded up, as when moving a load past a critical clearance, the following may occur. When proceeding toward stop 17, the sensing means will be momentarily actuated by a tripping means in the order 33, 35, and 37. If the velocity of the bridge 9 is low enough, timer 47 will time out and reset static logic circuits 41, 43, and 45 before sensing means 37 is actuated. When sensing means 37 is actuated, the pulse therefrom will "set" static logic circuit 45. If the velocity of the bridge 9 is then increased, sensing means 33 will be actuated by the next succeeding tripping means, to start timer 47 through static logic circuit 45. Sensing means 35 and 37 will almost immediately be actuated, and certainly, at any reasonable speed, before timer 47 has timed out. The subsequent signal from sensing means 37 would indicate to static logic circuit 45 that the bridge was exceeding the maximum permissible speed and would actuate the braking means 132 even though the bridge was not, in fact, exceeding such speed.

To prevent the above result, static logic circuit 203 prevents initiation of the operation of braking means 132 by static logic circuits 41 and 45 if the initiating signal would originate in the trailing or last sensing means. In FIGURE 1, this would be sensing means 37 in the case of movement of the bridge to the left and sensing means 33 in the instance of movement to the right. This is accomplished by providing a reset signal from NOR element 209 of static logic circuit 203 to NOR element 91 of static logic circuit 45 when sensing means 35 is acutated and static logic circuit 41 is timing to prevent logic circuit 45 from becoming operative to actuate braking means 132. Conversely, if bridge 9 is moving in the other direction, static logic circuit 203 provides a reset signal from NOR element 211 to NOR element 83 of static logic circuit 41 to prevent that circuit from becoming operative to actuate braking means 132.

For example, with bridge 9 moving to the left toward stop 17, when sensing means 33 is actuated a signal is supplied to NOR element 205 which removes the output signal from that element to NOR element 209. The other inputs to NOR element 209 comprise input signals from NOR element 101 of static logic circuit 41 and NOR element 125 of static logic circuit 43. These signals remove the output signal from NOR element 209 to NOR element 91 of static logic circuit 45.

When sensing means 35 is actuated, as bridge 9 proceeds further to the left, both the output signals of NOR element 101 and NOR element 125 are removed so that all of the input signals to NOR element 209 are removed. In accordance with its logic function, NOR element 209 provides an output signal to NOR element 91 of static logic circuit 45. This signal resets that logic circuit in the same manner as the reset signal from timer 47 in conductors 197 and 93. With static logic circuit 45 reset, any subsequent actuation of sensing means 37 is ineffective to operate the static logic circuit so that braking means 132 is not actuated.

In a similar manner, with bridge 9 moving to the right, when sensing means 37 is actuated a signal is supplied to NOR element 207 of static logic circuit 203 which removes the output signal from that element to NOR element 211. The other input signals to NOR element 211 comprise an input signal from NOR element 109 of static logic circuit 45 and the same signal from NOR element 125 of static logic circuit 43 supplied to NOR element 209. The output signal from NOR element 211 to NOR element 83 of static logic circuit 41 is removed.

When sensing means 35 is actuated, as bridge 9 proceeds further to the right, both the output signal of NOR element 109 and the output signal of NOR element 125 are removed. As all the input signals to NOR element 211 are removed, NOR element 211 provides an output signal to NOR element 83 which resets static logic circuit 41 in the same manner as a reset signal from timer 47 in conductors 197 and 93. With static logic circuit 41 reset, any subsequent actuation of sensing means 33 is ineffective to operate static logic circuit 41, so that braking means 132 is not actuated.

It will be appreciated from the foregoing description that the present invention provides a speed control which permits a travelling bridge, trolley, or other vehicle to operate at maximum speed along its path of travel except when the danger exists that such operation, unless limited, will cause the vehicle to strike stops at either end of the path at greater than a safe speed. In the latter instance, the control actuates a braking means to reduce the speed of the vehicle. The control contains numerous safety features to insure such operation in spite of the failure of certain parts of the control or errors on the part of the vehicle operator.

Although the control has been described as employed at the ends of a vehicle path, it will be readily apparent that the control and associated apparatus may be used to establish a speed control zone at an intermediate point in the vehicle path, as for example, where a travelling bridge passes a critical clearance or obstruction.

While the control of the above invention has been described in terms of a control for limiting the maximum speed of a vehicle the control may similarly be used to control the minimum speed of a vehicle. Such a control would function in an analogous manner so that if the vehicle failed to traverse the distance in a certain minimum time, it would provide an accelerating force to the vehicle as by motor 503 also shown in phantom in FIGURE 2.

A maximum speed limit control and a minimum speed limit control may be employed on the same vehicle to limit its speed to any desired range of speed.

Further, it may be advantageous in certain instances to provide speed control by adjusting or programming the timing interval of the timer rather than adjusting the spacing of the rail mounted indicators. The control would function in a similar manner in either instance. Adjustment of either the timing interval of the timer or the spacing of the rail mounted indicators may be utilized to compensate for such factors as alterations in the decelerating force or response time of the braking means.

Other modifications and embodiments will become apparent to those skilled in the art and it is intended to cover all such embodiments as come within the scope of the following claims.

Various modes of carrying out the invention are contemplated as being within the scope of the following claims particularly pointing out and distinctly claiming the subject matter which is regarded as the invention:

1. A speed control system; for determining the speed of a vehicle having a speed changing device and for initiating a speed change if the determined speed is in variation with a desired speed comprising:
    a plurality of indicators in the path of said vehicle, spaced apart the distance the vehicle will travel in a predetermined timing interval at the desired speed;
    a plurality of sensing means on said vehicle sequentially actuatable by said plurality of indicators; and
    a control means connected to and operable by said plurality of sensing means, said control means connected to, and actuating, said speed changing device and including,
    a first circuit component operable by the first of said sensing means becoming actuated by one of said indicators to prepare said control means to determine the speed of said vehicle,
    a timing means providing said predetermined timing interval connected to said control means,
    a second circuit component operable by the second of said sensing means becoming actuated by one of said indicators to start said timing interval to determine the speed of said vehicle, and
    a third circuit component operable by said first sensing means and said timing means to operate said control means to actuate the speed changing device and initiate a change in the speed of said vehicle if the determined speed of said vehicle is in variance with the desired speed.

2. A speed control system for determining the speed of a vehicle having a speed retarding device and for initiating a speed reduction if the determined speed is in excess of a desired maximum speed comprising:
    a plurality of indicators in the path of said vehicle, spaced apart the distance the vehicle will travel in a predetermined timing interval at the desired maximum speed;
    a plurality of sensing means on said vehicle sequentially actuatable by said plurality of indicators; and
    control means connected to and operable by said plurality of sensing means, said control means connected to, and actuating, said speed retarding device and including,
    a first circuit component operable by the first of said sensing means becoming actuated by one of said indicators to prepare said control means to determine the speed of said vehicle,
    a timing means providing said predetermined timing interval connected to said control means,
    a second circuit component operable by the second of said sensing means becoming actuated by one of said indicators to start said timing interval to determine the speed of said vehicle, and
    a third circuit component operable by said first sensing means and said timing means to operate said control means to actuate said speed retarding device and initiate a reduction in the speed of said vehicle except when said timing means reaches the end of its predetermined timing interval before said first sensing means becomes actuated by a subsequent one of said indicators.

3. The system of claim 2 having additional circuitry operable by said sensing means for determining the speed of a vehicle in a plurality of directions and for initiating a reduction of it if the determined speed is in excess of a desired maximum speed.

4. The system of claim 2 having circuitry to prevent the initiation of a reduction in vehicle speed if said initiation would be caused by the actuation of the last of said sequentially actuable sensing means.

5. A speed control system for determining the speed of a vehicle having a speed retarding device and for initiating a speed reduction if the determined speed is in excess of a desired maximum speed comprising:
    a plurality of indicators in the path of said vehicle;
    a plurality of sensing means specially mounted on said vehicle sequentially actuatable by said plurality of indicators; and said plurality of indicators being spaced apart the sum of the distance the vehicle will travel in a predetermined timing interval at the desired maximum speed plus the spacing between said sensing means;

control means connected to and operable by said plurality of sensing means, said control means connected to, and actuating, said speed retarding device and including, a first circuit component operable by the first of said sensing means becoming actuated by one of said indicators to prepare said control means to determine the speed of said vehicle, a timing means providing said the predetermined timing interval connected to said control means, a second circuit component operable by the second of said sensing means becoming actuated by one of said indicators to start said timing interval to determine the speed of said vehicle, a third circuit component operable by said first sensing means and said timing means to operate said control means to actuate said speed retarding device and initiate a reduction in the speed of said vehicle except when said timing means reaches the end of its predetermined timing interval before sad first sensing means becomes actuated by a subsequent one of said indicators, a fourth circuit component also operable upon the second of said sensing means becoming actuated by the one of said indicators to prepare said control means to determine the speed of said vehicle in event of failure of the first of said sensing means or said first circuit component operable thereby.

a fifth circuit component operable upon the third of said sensing means becoming actuated by the one of said indicators to start said timing interval to determine the speed of said vehicle, and a sixth circuit component operable by said second sensing means and said timing means to operate said control means to actuate said speed retarding device and initiate a reduction in the speed of said vehicle except when said timing means reaches the end of its predetermined timing interval before said second sensing means becomes actuated by the subsequent one of said indicators.

6. A speed control system for determining the speed of the bridge or trolley of a travelling crane having a speed retarding device and for reducing the determined speed if it is in excess of a desired maximum speed comprising:

a plurality of indicators in the path of said vehicle;

a plurality of sensing means on said vehicle actuatable by said plurality of indicators; and said plurality of indicators being spaced apart the sum of the distance the vehicle will travel in a predetermined timing interval at the desired maximum speed plus the spacing between said sensing means;

control means connected to and operable by said plurality of sensing means said control means connected to, and actuating, said speed retarding device and including, a first circuit component; operable by the first of said sensing means becoming actuated by one of said indicators to prepare and control means to determine the speed of said vehicle, a timing means providing said predetermined timing interval connected to said control, a second circuit component operable by the second of said sensing means becoming actuated by one of said indicators to start said timing interval to determine the speed of said vehicle, a third circuit component operable by said first sensing means and said timing means to operate said control means to actuate said speed retarding device and initiate reduction in the speed of said vehicle if said timing means reaches the end of its predetermined timing interval before said first sensing means becomes actuated by a susequent one of said indicators, a fourth circuit componet also operable upon the second of said sensing means becoming actuated by the one of said indicators to prepare said control means to determine the speed of said vehicle in the event of failure of the first of said sensing means or said first circuit component operable thereby.

a fifth circuit component operable upon the third of said sensing means becoming actuated by the one of said indicators to start said timing means to determine the speed of said vehicles, and a sixth circuit component operable by said second sensing interval and said timing means to operate said control means to actuate said speed retarding device and initiate a reduction in the speed of said vehicle if said timing means reaches the end of its predetermined timing interval before said second sensing means becomes actuated by the subsequent one of said indicators.

References Cited

UNITED STATES PATENTS

| | | | |
|---|---|---|---|
| 1,820,042 | 8/1931 | Baseler et al. | 246—182 |
| 3,289,783 | 12/1966 | Butler | 180—82.1 |

FOREIGN PATENTS 1,128,908  5/1962  Germany.

ARTHUR L. LA POINT, *Primary Examiner.*

S. T. KRAWCZEWICZ, *Assistant Examiner.*